United States Patent
Wei et al.

(10) Patent No.: US 12,094,473 B2
(45) Date of Patent: Sep. 17, 2024

(54) METHOD FOR CONTROLLING ELECTRICAL APPLIANCE, AND NON-TRANSITORY COMPUTER-READABLE STORAGE MEDIUM

(71) Applicants: Gree Electric Appliances, Inc. of Zhuhai, Guangdong (CN); Leayun Technology Co., Ltd. of Zhuhai, Guangdong (CN)

(72) Inventors: Deping Wei, Guangdong (CN); Jutao Jia, Guangdong (CN); Zirong Huang, Guangdong (CN); Guangxu Hu, Guangdong (CN); Lin Dai, Guangdong (CN)

(73) Assignees: Gree Electric Appliances, Inc. of Zhuhai, Zhuhai (CN); Leayun Technology Co., Ltd. of Zhuhai, Zhuhai (CN)

( * ) Notice: Subject to any disclaimer, the term of this patent is extended or adjusted under 35 U.S.C. 154(b) by 227 days.

(21) Appl. No.: 17/625,423

(22) PCT Filed: Jul. 1, 2020

(86) PCT No.: PCT/CN2020/099770
§ 371 (c)(1),
(2) Date: Jan. 7, 2022

(87) PCT Pub. No.: WO2021/051955
PCT Pub. Date: Mar. 25, 2021

(65) Prior Publication Data
US 2022/0262372 A1    Aug. 18, 2022

(30) Foreign Application Priority Data

Sep. 17, 2019  (CN) .......................... 201910875806.8

(51) Int. Cl.
*G10L 17/22* (2013.01)
*G05B 15/02* (2006.01)
(Continued)

(52) U.S. Cl.
CPC .............. *G10L 17/22* (2013.01); *G05B 15/02* (2013.01); *G05B 19/042* (2013.01);
(Continued)

(58) Field of Classification Search
CPC ......... G10L 17/22; G10L 17/00; G05B 15/02; G05B 19/042; G05B 19/418;
(Continued)

(56) References Cited

U.S. PATENT DOCUMENTS 7,217,059 B1 * 5/2007 Rudduck ............... F16B 5/0657
403/324
9,246,837 B2 * 1/2016 Dixon ...................... H04L 45/38
(Continued)

FOREIGN PATENT DOCUMENTS

CA      2308950 A1 * 11/2000  ............. G06F 3/167
CN    103729585 A  *  4/2014  ............. G05B 15/02
(Continued)

OTHER PUBLICATIONS

International Search Report, with a mailing date of Sep. 29, 2020, in International application No. PCT/CN2020/099770, filed on Jul. 1, 2020 (6 pages).

*Primary Examiner* — Edwin S Leland, III
(74) *Attorney, Agent, or Firm* — McAndrews, Held & Malloy, Ltd.

(57) ABSTRACT

A method for controlling an electrical appliance, and a non-transitory computer-readable storage medium. The control method comprises: receiving a voice control instruction (S101); when the identity of a user who issued the voice control instruction is determined to be a child, acquiring a
(Continued)

child knowledge graph (S102); when determined that a control object is a first electrical appliance, determining whether a knowledge expression corresponding to the first electrical appliance exists in the child knowledge graph (S103); if a knowledge expression corresponding to the first electrical appliance doesn't exist in the child knowledge graph, then not responding to the voice control instruction; otherwise, carrying out processing on the voice control instruction according to the knowledge expression corresponding to the first electrical appliance in the child knowledge graph (S104).

5 Claims, 4 Drawing Sheets

(51) Int. Cl.
*G05B 19/042* (2006.01)
*G05B 19/418* (2006.01)
*G06F 3/16* (2006.01)
*G10L 17/00* (2013.01)

(52) U.S. Cl.
CPC ............ *G05B 19/418* (2013.01); *G06F 3/167* (2013.01); *G05B 2219/23386* (2013.01); *G05B 2219/2633* (2013.01); *G05B 2219/2642* (2013.01); *G05B 2219/2654* (2013.01); *G10L 17/00* (2013.01); *Y02P 90/02* (2015.11)

(58) Field of Classification Search
CPC .. G05B 2219/23386; G05B 2219/2633; G05B 2219/2642; G05B 2219/2654; G06F 3/167; Y02P 90/02

USPC ......................................................... 704/246
See application file for complete search history.

(56) References Cited

U.S. PATENT DOCUMENTS

| 2006/0085525 | A1* | 4/2006 | Beck ................... H04L 12/2834 |
| | | | 707/E17.107 |
| 2007/0017949 | A1* | 1/2007 | Salinas ..................... A45F 5/00 |
| | | | 224/678 |
| 2017/0036344 | A1 | 2/2017 | Gupta et al. |
| 2018/0018261 | A1* | 1/2018 | Vekiarides .......... G06F 12/0897 |
| 2022/0262372 | A1* | 8/2022 | Wei ....................... G05B 19/042 |

FOREIGN PATENT DOCUMENTS

| CN | 104615004 | A | * | 5/2015 | |
| CN | 104678806 | A | * | 6/2015 | |
| CN | 105527852 | A | * | 4/2016 | |
| CN | 105933188 | A | | 9/2016 | |
| CN | 106328143 | A | * | 1/2017 | ............ G05B 19/04 |
| CN | 106647301 | A | * | 5/2017 | |
| CN | 106886161 | A | | 6/2017 | |
| CN | 107942719 | A | * | 4/2018 | |
| CN | 207516934 | U | | 6/2018 | |
| CN | 108509784 | A | | 9/2018 | |
| CN | 108720661 | A | | 11/2018 | |
| CN | 109729400 | A | * | 5/2019 | |
| CN | 109754804 | A | * | 5/2019 | |
| CN | 110320815 | A | * | 10/2019 | ............ G05B 15/02 |
| CN | 110579977 | A | * | 12/2019 | ............ G05B 15/02 |
| JP | 2003111157 | A | * | 4/2003 | |
| WO | WO-2004010304 | A1 | * | 1/2004 | ........... G06F 3/0622 |

\* cited by examiner

METHOD FOR CONTROLLING ELECTRICAL APPLIANCE, AND NON-TRANSITORY COMPUTER-READABLE STORAGE MEDIUM

CROSS-REFERENCE TO RELATED APPLICATION

This application is a 371 of International Patent Application No. PCT/CN2020/099770, filed Jul. 1, 2020, which claims the priority of Chinese Patent Application No. 201910875806.8, filed on Sep. 17, 2019 to the State Intellectual Property Office of China and entitled "Method and Apparatus for Controlling Electrical Appliance, and Computer-Readable Storage Medium", the disclosures of which are hereby incorporated by reference in their entireties.

TECHNICAL FIELD

This application relates to the field of electrical appliance control, and in particular, to a method for controlling an electrical appliance, and a non-transitory computer-readable storage medium.

BACKGROUND

With the development of Internet technologies and industries and the improvement of the living standard of a user, intelligent electrical appliances have gradually entered ordinary families. Intelligent electrical apparatus, especially the electrical appliances having voice control functions, are very convenient for people to control different electrical appliances.

However, some users lacking of safety knowledge, such as children, have large potential safety hazards to use voices to control electrical appliances. For example, if the children switch on or off the electrical appliances (such as electric lamps) through voice control within a period of time, irreversible loss may be caused to the electrical appliances, which shortens the service life of the electrical appliances. For another example, if the children control some electrical appliances (such as electric ovens) with high risk coefficients through voices, the occurrence of the potential safety hazards, such as fire, may be caused, which may pose a threat to the property safety, even personal safety, of a user. Thus, the electrical appliances in the prior art have a technical problem of low safety.

SUMMARY

Embodiments of this application provide a method for controlling an electrical appliance, to resolve a technical problem in the prior art of low safety of the electrical appliance.

On the first aspect, an embodiment of this application provides a method for controlling an electrical appliance. The method includes as follows:
- a voice control instruction is received, which includes a control object.
- when the identity of a user issuing the voice control instruction is determined to be a child, a child knowledge graph is acquired, and the child knowledge graph includes a knowledge expression of at least one electrical appliance under children's control. A knowledge expression corresponding to each electrical appliance under children's control of the at least one electrical appliance under children's control includes an entity name of the electrical appliance under children's control.
- when the control object is determined to be a first electrical appliance, whether the knowledge expression corresponding to the first electrical appliance exists in the child knowledge graph is determined.
- if the knowledge expression corresponding to the first electrical appliance doesn't exist in the child knowledge graph, the voice control instruction is not responded.
- otherwise, the voice control instruction is processed according to the knowledge expression corresponding to the first electrical appliance in the child knowledge graph.

In this embodiment of this application, when the identity of a user issuing the voice control instruction is determined to be a child, the child knowledge graph is obtained. The child knowledge graph includes the knowledge expression of at least one electrical appliance under children's control. Then, whether the knowledge expression corresponding to the first electrical appliance exists in the child knowledge graph is determined. If no, the voice control instruction is not responded. Only when the knowledge expression corresponding to the first electrical appliance exists in the child knowledge graph, the voice control instruction is processed according to the knowledge expression corresponding to the first electrical appliance. In this way, children may only control the electrical appliance under children's controls present in the knowledge graph without controlling the electrical appliances under children's control (that is, electrical appliances out of children's control posing a safety threat to the children) not present in the child knowledge graph. Thus, the loss of the electrical appliances out of children's control caused by the children may be reduced. In addition, the threats to the property safety, even personal safety, of a user due to the electrical appliances out of children's control may be avoided, so that the safety of the child is guaranteed, thereby enhancing the safety performance of electrical appliances.

Optionally, the voice control instruction further includes a to-be-controlled attribute corresponding to the control object. The knowledge expression corresponding to each electrical appliance under children's control further includes at least one attribute of the electrical appliance under children's control controllable relative a child. The operation of processing the voice control instruction according to the knowledge expression corresponding to the first electrical appliance in the child knowledge graph includes: determining whether the to-be-controlled attribute exists in at least one attribute of the first electrical appliance controllable relative to the child in the knowledge expression corresponding to the first electrical appliance; if yes, responding to the voice control instruction to control the to-be-controlled attribute of the first electrical appliance; otherwise, not responding to the voice control instruction.

In this implementation, the attribute of the first electrical appliance controllable for the child is limited by the child knowledge graph. That is to say, the child can only control the attribute in at least one attribute of the first electrical appliance controllable relative to the child recorded in the child knowledge graph, so that the safety of the electrical appliances may be further enhanced.

Optionally, the voice control instruction further includes a target control value corresponding the to-be-controlled attribute. The knowledge expression corresponding to each electrical appliance under children's control further includes the attribute value range of each attribute controllable relative to the child in at least one attribute of the electrical appliance under children's control controllable relative to the child. The operation of responding to the voice control instruction to control the to-be-controlled attribute of the first electrical appliance includes: determining the attribute value range of the to-be-controlled attribute controllable relative to the child according to the knowledge expression of the first electrical appliance; determining whether the target control value is within the attribute value range of the to-be-controlled attribute controllable relative to the child; if yes, setting the attribute value of the to-be-controlled attribute of the first electrical appliance as the target control value; otherwise, setting the attribute value of the to-be-controlled attribute of the first electrical appliance based on the attribute value range of the to-be-controlled attribute controllable relative to the child.

In this implementation, by means of the child knowledge graph, the range of the attribute value of the electrical appliance controllable for the child is limited. That is to say, if the target control value in the child voice control instruction is within the attribute value range of the to-be-controlled attribute controllable relative to the child, control is achieved. If the target control value in the child voice control instruction is not in the attribute value range of the to-be-controlled attribute controllable relative to the child, the attribute value of the to-be-controlled attribute of the first electrical appliance is set based on the attribute value range of the to-be-controlled attribute controllable relative to the child. In this way, the safety of the electrical appliance may be further enhanced.

Optionally, the operation before obtaining the child knowledge graph further includes: extracting danger description information of a plurality of electrical appliances from a network resource. The danger description information of each of the plurality of electrical appliances includes danger information of the electrical appliance for the child. According to the danger description information of the plurality of electrical appliances, the plurality of electrical appliances are divided into the electrical appliances under children's control and electrical appliances out of children's control. Knowledge extraction is performed on the danger description information of at least one electrical appliance under children's control to construct the knowledge expression of at least one electrical appliance under children's control. The child knowledge graph includes the knowledge expression of at least one electrical appliance under children's control. The knowledge expression corresponding to each electrical appliance under children's control in at least one electrical appliance under children's control includes an entity name of the electrical appliance under children's control, and at least one attribute of the electrical appliance under children's control controllable relative to the child. The child knowledge graph is formed based on the knowledge expression of at least one electrical appliance under children's control.

In this implementation, a high reliability is achieved by constructing the child knowledge graph through network big data analysis. By means of the child knowledge graph generated through such a method to control the electrical appliance, the safety of the electrical appliance can be further enhanced.

Optionally, the knowledge expression corresponding to each electrical appliance under children's control further includes the attribute value range of each attribute controllable relative to the child in at least one attribute of the electrical appliance under children's control controllable relative to the child. The operation of extracting the knowledge extraction on the danger description information of at least one electrical appliance under children's control to construct the knowledge expression of at least one electrical appliance under children's control includes: determining an attribute value control condition of an adult on each attribute of the electrical appliance under children's control from the danger description information of each electrical appliance under children's control; and based on the attribute value control condition of the adult on each attribute of the electrical appliance under children's control, determining the attribute value range of each attribute, controllable relative to the child, of the electrical appliance under children's control.

Through this implementation, based on the control of the adult on the electrical appliance, an electronic device determines the attribute value range of each attribute, controllable relative to the child, of the electrical appliance under children's control, to cause the determined attribute value range to be more reliable, thereby further enhancing the safety of the electrical appliance.

On the second aspect, an embodiment of this application provides an apparatus for controlling an electrical appliance. The apparatus includes a receiving module, an acquisition module, and a processing module. The receiving module is configured to receive a voice control instruction, and the voice control instruction includes a control object. The acquisition module is configured to, when a identity of a user issuing the voice control instruction is determined to be a child, acquire a child knowledge graph. The child knowledge graph includes a knowledge expression of at least one electrical appliance under children's control. The knowledge expression corresponding to each electrical appliance under children's control of the at least one electrical appliance under children's control includes an entity name of the electrical appliance under children's control. The processing module is configure to, when the control object is determined to be a first electrical appliance, determine whether the knowledge expression corresponding to the first electrical appliance exists in the child knowledge graph. If the knowledge expression corresponding to the first electrical appliance doesn't exist in the child knowledge graph, the voice control instruction is not responded. Otherwise, the voice control instruction is processed according to the knowledge expression corresponding to the first electrical appliance in the child knowledge graph.

Optionally, the voice control instruction further includes a to-be-controlled attribute corresponding to the control object. The knowledge expression corresponding to each electrical appliance under children's control further includes at least one attribute of the electrical appliance under children's control controllable relative a child. When processing the voice control instruction according to the knowledge expression corresponding to the first electrical appliance in the child knowledge graph, the processing module is configured to determine whether the to-be-controlled attribute exists in at least one attribute of the first electrical appliance controllable relative to the child in the knowledge expression corresponding to the first electrical appliance. If yes, the voice control instruction is responded to control the to-be-controlled attribute of the first electrical appliance. Otherwise, the voice control instruction is not responded.

Optionally, the voice control instruction further includes a target control value corresponding the to-be-controlled attribute. The knowledge expression corresponding to each electrical appliance under children's control further includes the attribute value range of each attribute controllable relative to the child in at least one attribute of the electrical appliance under children's control controllable relative to the child. When responding to the voice control instruction to control the to-be-controlled attribute of the first electrical appliance, the processing module is configured to determine the attribute value range of the to-be-controlled attribute controllable relative to the child according to the knowledge expression of the first electrical appliance. Whether the target control value is within the attribute value range of the to-be-controlled attribute controllable relative to the child is determined. If yes, the attribute value of the to-be-controlled attribute of the first electrical appliance is set as the target control value. Otherwise, the attribute value of the to-be-controlled attribute of the first electrical appliance is set based on the attribute value range of the to-be-controlled attribute controllable relative to the child.

Optionally, the apparatus further includes a knowledge graph construction module. The knowledge graph construction module is configured to, before the acquisition module obtains the child knowledge graph, danger description information of a plurality of electrical appliances is extracted from a network resource. The danger description information of each of the plurality of electrical appliances includes danger information of the electrical appliance for the child. Based on the danger description information of the plurality of electrical appliances, the plurality of electrical appliances are divided into the electrical appliances under children's control and electrical appliances out of children's control. Knowledge extraction is performed on the danger description information of at least one electrical appliance out of children's control to construct the knowledge expression of at least one electrical appliance out of children's control. The child knowledge graph includes the knowledge expression of at least one electrical appliance out of children's control. The knowledge expression corresponding to each electrical appliance out of children's control in at least one electrical appliance out of children's control includes an entity name of the electrical appliance out of children's control, and at least one attribute of the electrical appliance out of children's control controllable relative to the child. The child knowledge graph is formed based on the knowledge expression of at least one electrical appliance out of children's control.

Optionally, the knowledge expression corresponding to each electrical appliance under children's control further includes the attribute value range of each attribute controllable relative to the child in at least one attribute of the electrical appliance under children's control controllable relative to the child. When extracting the knowledge extraction on the danger description information of at least one electrical appliance under children's control to construct the knowledge expression of at least one electrical appliance under children's control, the knowledge graph construction module is configured to determine an attribute value control condition of an adult on each attribute of the electrical appliance under children's control from the danger description information of each electrical appliance under children's control. The knowledge graph construction module is further configured to, based on the attribute value control condition of the adult on each attribute of the electrical appliance under children's control, determine the attribute value range of each attribute, controllable relative to the child, of the electrical appliance under children's control.

On the third aspect, an embodiment of this application provides an electronic device. The electronic device includes at least one processor, and a memorizer and a communication interface that are connected to at least one processor. The memorizer stores an instruction capable of being performed by the at least one processor. The at least one processor is used to perform the instruction in the memorizer, to perform the method described in the first aspect according to the embodiment of this application or any optional implementations in the first aspect when the instruction is performed.

On the fourth aspect, an embodiment of this application provides a computer-readable storage medium. The computer-readable storage medium stores a computer instruction. When the computer instruction is operated on a computer, the method described in the first aspect according to the embodiment of this application or any optional implementations in the first aspect is performed by the computer.

The beneficial effects achieved by the implementations in the second aspect to the fourth aspect may refer to the beneficial effects achieved by the implementations corresponding to the first aspect, which will not be repeated again.

The beneficial effects of this application are as follows.

DETAILED DESCRIPTION OF THE EMBODIMENTS

Embodiments of this application provide a method and apparatus for controlling an electrical appliance, and a computer-readable storage medium, to resolve the technical problem in which electrical appliances in the prior art have a low safety performance.

The technical solutions of this application will be described in detail with reference to the drawings and specific embodiments. It can be appreciated that the embodiments of this application and specific features in the embodiments are detailed description of this application and do not limit the technical solutions of this application. The embodiments in this application and the technical features in the embodiments may be combined with one another without conflict.

It is to be understood that, in the description of the embodiments of this application, the terms "first", "second", etc. are for descriptive purposes only, and cannot be understood as indicating or implying relative importance. In addition, in the description of this application, the meaning of "multiple" is two or more.

The term "and/or" in the embodiments of this application is merely an association relationship describing related objects, which means that there may be three relationships, for example, A and/or B may indicate three cases: A exists alone, A and B exist simultaneously, and B exists alone. In addition, the character "I" in this paper generally indicates that the related objects are in an "or" relationship.

A method for controlling an electrical appliance provided by an embodiment of this application is introduced below. The method may be applied to an electronic device. The electronic device may be a mobile phone, a tablet computer, a notebook computer, a wearable device, an audio/video playback device and other any personal terminals having a computing power and a voice response function, or household appliances (such as a smart television, a smart washing machine, and a smart air conditioner and the like), or server (such as a control center of a smart appliance), or an electronic device system consisting of a plurality of such electronic devices. The embodiments of this application do not make specific limitations.

Figure 1:
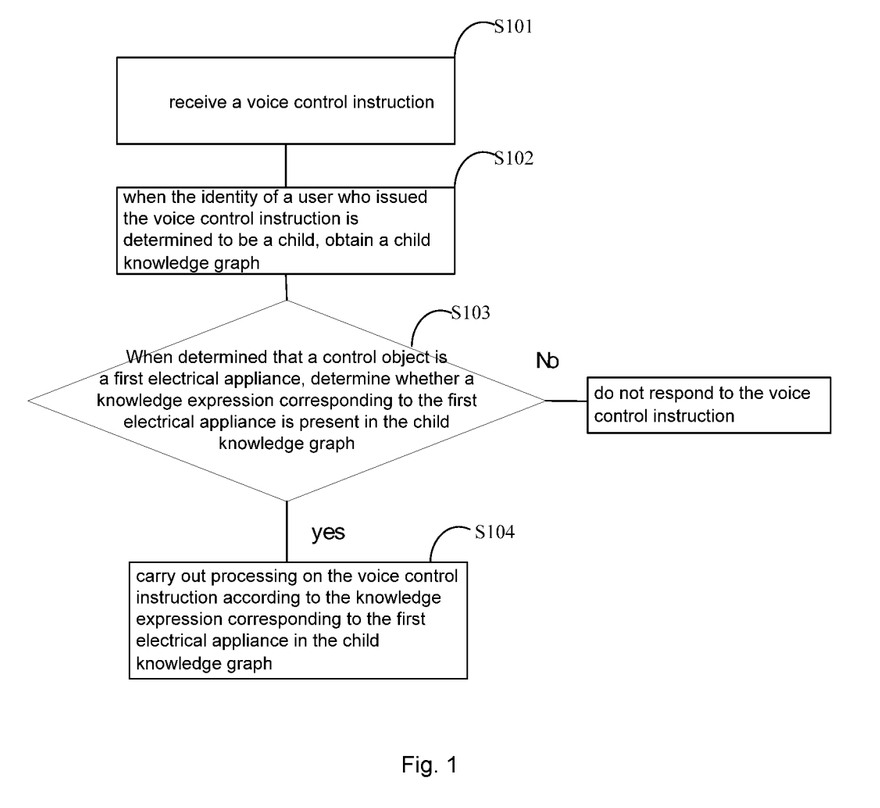
FIG. 1 is a flowchart of a method for controlling an electrical appliance according to an embodiment of this application.

Referring to FIG. 1, a flowchart of a method for controlling an electrical appliance according to an embodiment of this application, the method includes the following steps.

At S101, a voice control instruction is received, and the voice control instruction includes a control object.

Specifically, when the electronic device receives the voice control instruction, a Natural Language Processing (NLP) technology is utilized to process a language of the voice control instruction, so that the control object in the voice control instruction is obtained. The control object in the voice control instruction may be electrical appliances, such as an air conditioner, an electric lamp, an induction cooker, and a fan. In addition, the voice control instruction may further include a to-be-controlled attribute corresponding to the control object, and a target control value and the like.

Exemplarily, after the electronic device receives the voice control instruction of "turning the air conditioner to 18 degrees", the control object in the voice control instruction is analyzed to be the air conditioner.

At S102, when the identity of a user issuing the voice control instruction is determined to be a child, a child knowledge graph is obtained.

Specifically, the electronic device may locally store voice print features of at least one user in advance, or obtain the voice print features of at least one user from a could end. A child user is included in the at least one user. When the voice control instruction is received, the voice print feature of the user issuing the voice control instruction is identified. The identified voice print feature matches the voice print features of the at least one user. According to a matching result, the user issuing the voice control instruction is determined to be the child, and then, the child knowledge graph is obtained.

The knowledge graph describes various entities or concepts and relations thereof in the real world, and forms a huge semantic network diagram. A structure of the knowledge graph is composed of nodes and sides. The nodes may be entity attributes or other concepts. The sides indicate a relation between the nodes, for example, a relation between the entities, or a relation between the entities and the attributes. Each entity and each node and side related to the entity form the knowledge expression of the entity.

In this embodiment of this application, the entities in the child knowledge graph may be names of the electrical appliance under children's controls. The attributes may be the attributes (or operation parameters) corresponding to the electrical appliances. The relation may include a relation between the electrical appliances, for example, whether the electrical appliances are the electrical appliances under children's control, and a relation between the entities and attributes, for example, a "temperature" belongs to the operation parameter of an "air conditioner", and "water volume" belongs to the operation parameter of a "washing machine".

Figure 2:
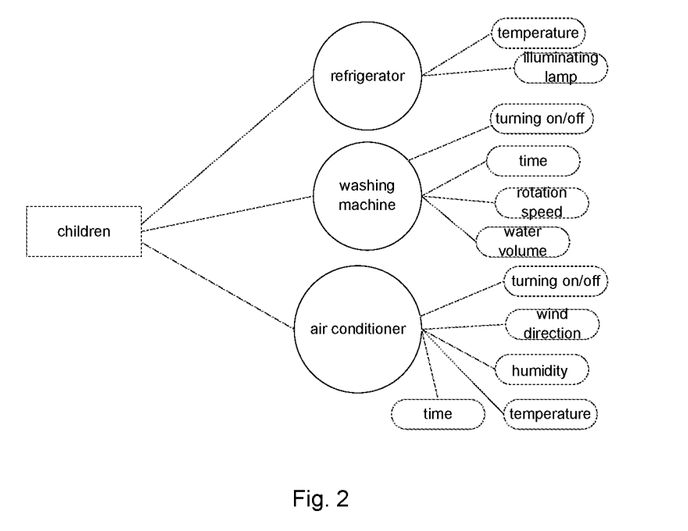
FIG. 2 is a schematic diagram of a child knowledge graph according to an embodiment of this application.

Exemplarily, referring to FIG. 2, which is a schematic diagram of a child knowledge graph according to an embodiment of this application. In the child knowledge graph, all entities (that is, the names of the electrical appliances) are the electrical appliances under children's control, such as a refrigerator, a washing machine, an air conditioner and the like in FIG. 2. The attributes refer to the operation parameters of the electrical appliances. For example, the attributes of the refrigerator include temperatures, illuminating lamps, etc., the attributes of the washing machine include turning on/off, time, rotation speed and water volume, and the attributes of the air conditioner include turning on/off, wind directions, temperatures, humidity, and time and the like.

Figure 3:
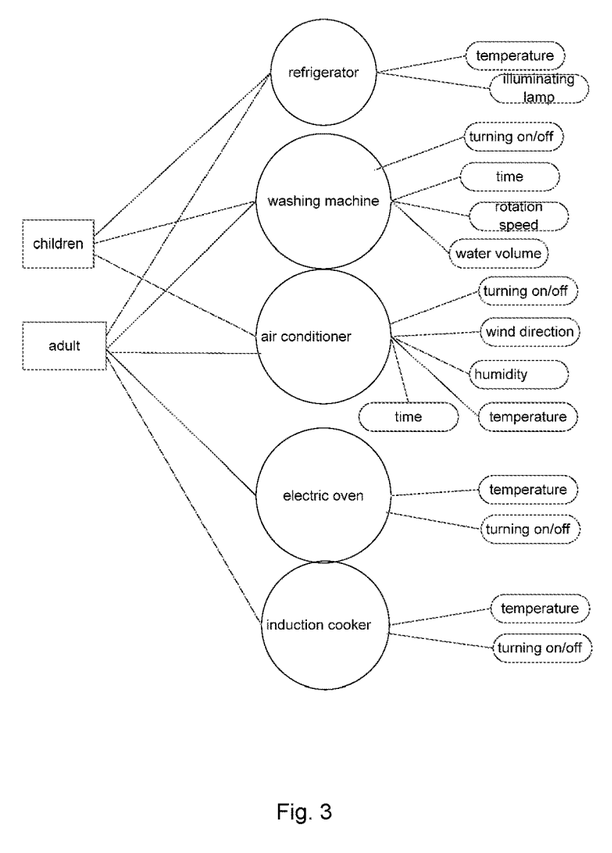
FIG. 3 is a schematic diagram of a knowledge graph according to an embodiment of this application.

During specific implementation, except that the child knowledge graph may exist independently as a separate set of knowledge graphs (as shown in FIG. 2), the child knowledge graph may also be included in other knowledge graphs, that is, as a part of other knowledge graphs. For example, the child knowledge graph may commonly exist along with an adult knowledge graph in one knowledge graph, such as the knowledge graph shown in FIG. 3. When the identity of the user issuing the voice control instruction is matched to be the child, it is required to screen the child knowledge graph from the knowledge graph (that is, the knowledge expressions corresponding to all electrical appliances under children's control).

At S103, when the control object is determined to be a first electrical appliance, whether the knowledge expression corresponding to the first electrical appliance exists in the child knowledge graph is determined.

Specifically, whether an entity name corresponding to the first electrical appliance exists in the child knowledge graph is determined. If the entity corresponding to the name of the first electrical appliance doesn't exist in the child knowledge graph, it indicates that the knowledge expression corresponding to the first electrical appliance does not exist, so that the first electrical appliance is identified to not be the electrical appliance under children's control. Thus, the voice control instruction is not responded, otherwise, S104 is performed.

Exemplarily, when the content of the voice control instruction is "open the electric oven", the control object in the voice control instruction is determined to be the electric oven. Then, according to the child knowledge graph, the entity name of the corresponding electric oven is determined to be not present in the child knowledge graph, so that it may be assumed that the electric oven is not the electrical appliance under children's control, not responding to the voice control instruction. In addition, an error prompt may be returned, for example, prompt sounds, such as "beep, beep" and "dangerous household appliances", are made, or when the electronic device is a device with a display screen, the prompt sounds, such as "dangerous household appliances need to be accompanied by adults", are displayed.

At S104, the voice control instruction is processed according to the knowledge expression corresponding to the first electrical appliance in the child knowledge graph.

Exemplarily, when the content of the voice control instruction is "turn the air conditioner to 18 degrees", by means of NLP analysis, the control object in the voice control instruction is determined to be the air conditioner. Then, the entity corresponding to the name of the air conditioner is determined to be present in the child knowledge graph (the child knowledge graph shown in FIG. 2) according to the knowledge graph. Thus, the voice control instruction is processed according to the knowledge expression corresponding to the air conditioner in the child knowledge graph.

In the above solution, when the identity of a user issuing the voice control instruction is determined to be a child, the child knowledge graph is obtained. The child knowledge graph includes the knowledge expression of at least one electrical appliance under children's control. Then, whether the knowledge expression corresponding to the first electrical appliance exists in the child knowledge graph is determined. If no, the voice control instruction is not responded. Only when the knowledge expression corresponding to the first electrical appliance exists in the child knowledge graph, the voice control instruction is processed according to the knowledge expression corresponding to the first electrical appliance. In this way, children may only control the electrical appliance under children's controls present in the knowledge graph without controlling the electrical appliance under children's controls (that is, electrical appliance out of children's control posing a safety threat to the children) not present in the child knowledge graph. Thus, the loss of the uncontrollable electrical appliances caused by the children may be reduced. In addition, the threats to the property safety, even personal safety, of a user due to the electrical appliance out of children's control is may be avoided, so that the safety of the children may be guaranteed, and the safety performance of electrical appliances may be enhanced.

Optionally, the attribute in the knowledge expression corresponding to each electrical appliance under children's control may only include at least one attribute controllable relative to the child, such as the child knowledge graph shown in FIG. 2. All attributes in FIG. 2 are the attributes controllable relative to the child. Correspondingly, the operation of processing the voice control instruction according to the knowledge expression corresponding to the first electrical appliance in the child knowledge graph specifically includes determining whether the to-be-controlled attribute exists in the knowledge expression corresponding to the first electrical appliance in the child knowledge graph. If yes, a step of responding to the voice control instruction to control the to-be-controlled attribute of the first electrical appliance is performed. If no, the voice control instruction is not responded.

Exemplarily, when the content of the voice control instruction is "close the refrigerator in an hour", the control object in the voice control instruction is determined to be the refrigerator, and the to-be-controlled attribute is duration. Then, according to the child knowledge graph shown in FIG. 2, the attribute of duration is determined to be not present in the knowledge expression of the refrigerator. Therefore, it may be assumed that the child cannot control the duration attribute of the refrigerator, the voice control instruction is not responded.

Exemplarily, when the content of the voice control instruction is "open the air conditioner", the control object in the voice control instruction is determined to be the air conditioner, and the to-be-controlled attribute is turning on/off. Then, according to the child knowledge graph shown in FIG. 2, the attribute of turning on/off is determined to be present in the knowledge expression of the air conditioner. Therefore, it may be assumed that the child can control the turning on/off of the air conditioner.

Figure 4:
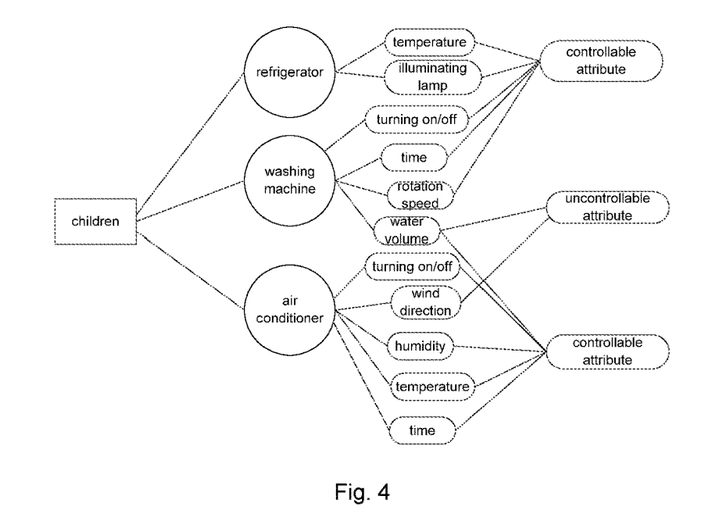
FIG. 4 is a schematic diagram of another child knowledge graph according to an embodiment of this application.

Definitely, the attribute in the knowledge expression corresponding to each electrical appliance under children's control may include at least one attribute controllable relative to the child, and at least one attribute uncontrollable relative to the child, as shown in FIG. 4. Correspondingly, the operation of processing the voice control instruction according to the knowledge expression corresponding to the first electrical appliance in the child knowledge graph specifically includes determining whether the to-be-controlled attribute exists in at least one attribute of the first electrical appliance controllable relative to the child according to the knowledge expression corresponding to the first electrical appliance in the child knowledge graph. If yes, a step of responding to the voice control instruction to control the to-be-controlled attribute of the first electrical appliance is performed. If no, the voice control instruction is not responded.

Exemplarily, when the voice control instruction of the child is "change the wind direction of the air conditioner to be upward", the to-be-controlled attribute in the voice control instruction is determined to be the wind direction. Then, the attribute of wind direction is determined to be present in the knowledge expression of the air conditioner in the child knowledge graph according to the child knowledge graph. However, the attribute of wind direction belongs to an uncontrollable attribute, so that the voice control instruction is not responded.

Through this implementation, the electronic device subdivides the attribute of the electrical appliance controllable for the child into a controllable attribute and an uncontrollable attribute based on the child knowledge graph. The attribute of the first electrical appliance controllable for the child is limited by the child knowledge graph. That is to say, the child can only control the attribute in at least one attribute of the electrical appliance controllable relative to the child recorded in the child knowledge graph, so that the safety of the electrical appliances may be further enhanced.

Optionally, in this embodiment of this application, the operation of responding to the voice control instruction to control the to-be-controlled attribute of the first electrical appliance at least includes the following two specific implementations.

In the first specific implementation, the electronic device directly controls the to-be-controlled attribute of the first electrical appliance according to the target control value in the voice control instruction.

For example, when the child voice control instruction is "turn the air conditioner to 18 degrees", the target control value analyzed by the electronic device is 18 degrees, so that the temperature of the air conditioner is directly set to 18 degrees.

Figure 5:
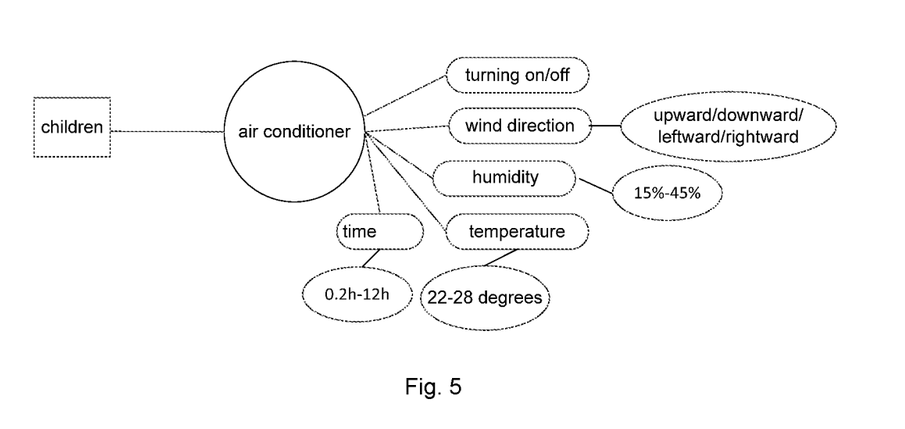
FIG. 5 is a schematic diagram of another child knowledge graph according to an embodiment of this application.

In the second specific implementation, in the child knowledge graph, the knowledge expression corresponding to each electrical appliance under children's control further includes the attribute value range of each attribute controllable relative to the child in at least one attribute of the electrical appliance under children's control controllable relative to the child. Whether the target control value is within the attribute value range of the to-be-controlled attribute controllable relative to the child is determined. If yes, the attribute value of the to-be-controlled attribute of the first electrical appliance is set as the target control value. Otherwise, the attribute value of the to-be-controlled attribute of the first electrical appliance is set based on the attribute value range of the to-be-controlled attribute controllable relative to the child.

Exemplarily, referring to FIG. 5, following the above example, when the child voice control instruction is "turn the air conditioner to 18 degrees", the target control value identified by the electronic device is 18 degrees. However, in the knowledge graph, the entity name is the temperature of the air conditioner in the knowledge graph, and is in a range of 22 degrees to 28 degrees. The target control value is 18 degrees, which is not within the range. Thus, the electronic device selects 22 degrees closest to the 18 degrees of the target control value within the range of 22 degrees to 28 degrees as the voice control instruction according to the range and the 18 degrees of the target control value, so that the air conditioner is set to 22 degrees.

In this implementation, by means of the knowledge graph, the range of the attribute value of the electrical appliance controllable for the child is limited. If the target control value in the child voice control instruction is within the attribute value range of the to-be-controlled attribute controllable relative to the child, control is achieved. If the target control value in the child voice control instruction is not in the attribute value range of the to-be-controlled attribute controllable relative to the child, the attribute value of the to-be-controlled attribute of the first electrical appliance is set based on the attribute value range of the to-be-controlled attribute controllable relative to the child. In this way, the safety of the electrical appliance may be further enhanced.

Figure 6:
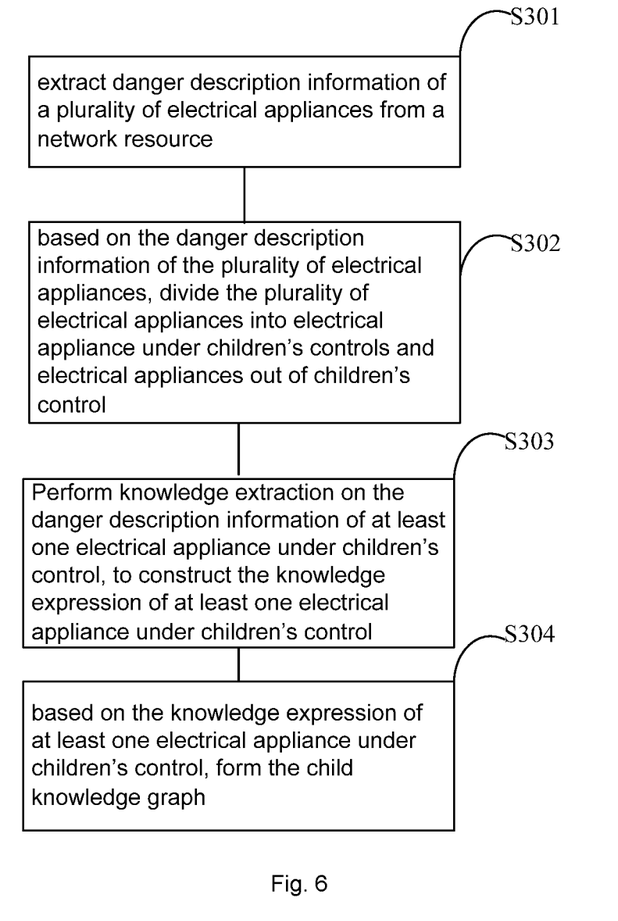
FIG. 6 is a flowchart of a method for constructing a child knowledge graph according to an embodiment of this application.

Optionally, before the child knowledge graph is obtained, it may be required to construct the child knowledge graph. The construction of the child knowledge graph may be completed by the electronic device in S101 to S103, and may also be sent to the electronic device in S101 to S103 after another electronic device completes a knowledge graph server. For example, the electronic device is a mobile phone. If the mobile phone is connected to a cloud server, the construction of the knowledge graph may be completed by the mobile phone, and may also be completed by the cloud server. The following embodiment takes the construction of the knowledge graph by the electronic device as an example. Referring to FIG. 6, FIG. 6 is a flowchart of the construction of a child knowledge graph according to an embodiment of this application.

At S301, danger description information of a plurality of electrical appliances is extracted from a network resource. The danger description information of each of the plurality of electrical appliances includes danger information of the electrical appliance for the child.

Specifically, the electronic device extracts the danger description information of the plurality of electrical appliances from the network resource by using some automatic and semi-automatic technical means. The danger description information of each of the plurality of electrical appliances includes danger information of the electrical appliance for the child. The technical means may include Internet worm acquisition, manual addition, and so on. The danger description information of the plurality of electrical appliances includes structured data, semi-structured data, and unstructured data. The structured data may be a relational data base. The semi-structured data may be the data with an extensible markup language (XML) format, and may also be the data with a javascript object notation (JSON) format. The unstructured data may be pictures, audios, and videos. For example, the unstructured data may be an article on dangerous electrical appliances in WeChat moments, and may also be a video about the dangerous electrical appliances uploaded by Tencent Video.

At S302, based on the danger description information of the plurality of electrical appliances, the plurality of electrical appliances are divided into electrical appliance under children's controls and electrical appliances out of children's control.

Exemplarily, in more than 10000 messages about danger information of lamps to children obtained by the electronic device on the Internet, only several messages indicate that the lamps are dangerous to the children, so that the lamps may be classified to the electrical appliances under children's control. If nearly two thirds of more than 10000 messages about danger information of electric ovens to children indicates that the electric ovens are dangerous to the children, the electric ovens are classified to the uncontrollable electrical appliances. By dividing the danger description information of the plurality of electrical appliances, classification information of the electrical appliances is obtained.

At S303, knowledge extraction is performed on the danger description information of at least one electrical appliance under children's control, to construct the knowledge expression of at least one electrical appliance under children's control.

Specifically, the electronic device performs knowledge extraction on the danger description information of at least one electrical appliance under children's control by running a programmed algorithm. Knowledge extraction is used for a cloud server to extract the entity name of each electrical appliance under children's control and at least one attribute of the electrical appliance under children's control controllable relative to a child from the danger description information of at least one electrical appliance under children's control. Optionally, an attribute value range of each attribute controllable relative to the child in at least one attribute may be further included. The entity name is the name (such as an air conditioner) of the electrical appliance under children's control identified by the danger description information of at least one electrical appliance under children's control. The attribute is an operation parameter (such as the temperature and wind direction of the air conditioner) of the electrical appliance under children's control. The attribute value range is a safety parameter value range (for example, the temperature value range of the air conditioner is 22 to 28 degrees) of the operation parameter of the electrical appliance under children's control relative to the child. Then, based on the name of at least one electrical appliance under children's control, at least one attribute of the electrical appliance under children's control controllable relative to the child, and the knowledge expression corresponding to the electrical appliance under children's control, the attribute value range of each attribute controllable relative to the child in at least one attribute of the electrical appliance under children's control controllable relative to the child is further included, to form the knowledge expression.

At S304, based on the knowledge expression of at least one electrical appliance under children's control, the child knowledge graph is formed, such as the child knowledge graph shown in FIG. 2 to FIG. 5.

Through the implementation, based on the danger information of the plurality of electrical appliances extracted from the Internet, the electronic device constructs the knowledge expression of at least one electrical appliance under children's control, and then forms the child knowledge graph based on the knowledge expression of at least one electrical appliance under children's control. The danger information of the plurality of electrical appliances extracted from the Internet has a high reliability. Thus, the electrical appliances are controlled by using the child knowledge graph generated by the method, so that the safety of the electrical appliances can be further enhanced.

Optionally, when knowledge extraction is performed on the danger description information of at least one electrical appliance under children's control to construct the knowledge expression of at least one electrical appliance under children's control, an attribute value control condition of an adult on each attribute of the electrical appliance under children's control may be determined from the danger description information of each electrical appliance under children's control. Based on the attribute value control condition of the adult on each attribute of the electrical appliance under children's control, the attribute value range of each attribute, controllable relative to the child, of the electrical appliance under children's control is determined.

Specifically, each interaction between a user and the electronic device may be recorded locally. When the electronic device identifies the current user to be an adult, the using record of the adult and the setting of its parameter value may be recorded. Then, based on the massive using record of the adult and the setting of its parameter value, the corresponding attribute value ranges are generated. Exemplarily, when an adult user tells an air conditioner to adjust a temperature to 22 degrees, the setting behavior of the adult and the set temperature are recorded. After that, based on such massive interaction records (for example, 1000 records) between the adult and the electronic device, a conventional setting range of most adults to the temperature of the air conditioner is generated, such as 18 to 28 degrees. Then, 18 to 28 degrees are set to an air conditioner temperature range controllable for children.

In the above solution, based on the control of the adult on the electrical appliance, the electronic device determines the attribute value range of each attribute, controllable relative to the child, of the electrical appliance under children's control, to cause the determined attribute value range to be more reliable, thereby further enhancing the safety of the electrical appliance.

Figure 7:
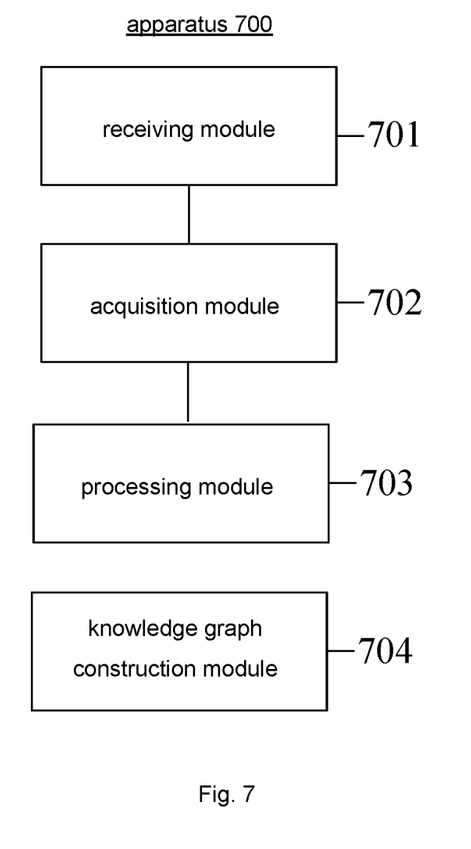
FIG. 7 is a schematic structural diagram of an apparatus for controlling an electrical appliance according to an embodiment of this application.

Based on the same inventive concept, an embodiment of this application further provides an apparatus 700 for controlling an electrical appliance. Referring to FIG. 7, the apparatus includes a receiving module 701, an acquisition module 702, and a processing module 703.

The receiving module 701 is configured to receive a voice control instruction, and the voice control instruction includes a control object.

The acquisition module 702 is configured to, when the identity of a user issuing the voice control instruction is determined to be a child, obtain a child knowledge graph. The child knowledge graph includes a knowledge expression of at least one electrical appliance under children's control. The knowledge expression corresponding to each electrical appliance under children's control in the at least one electrical appliance under children's control includes an entity name of the electrical appliance under children's control.

The processing module 703 is configured to, when the control object is determined to be a first electrical appliance, determine whether the knowledge expression corresponding to the first electrical appliance exists in the child knowledge graph. If the knowledge expression corresponding to the first electrical appliance doesn't exist in the child knowledge graph, the voice control instruction is not responded. Otherwise, the voice control instruction is processed according to the knowledge expression corresponding to the first electrical appliance in the child knowledge graph.

Optionally, the voice control instruction further includes a to-be-controlled attribute corresponding to the control object. The knowledge expression corresponding to each electrical appliance under children's control further includes at least one attribute of the electrical appliance under children's control controllable relative to the child.

When processing the voice control instruction according to the knowledge expression corresponding to the first electrical appliance in the child knowledge graph, the processing module 703 is specifically configured to determine whether the to-be-controlled attribute exists in at least one attribute of the first electrical appliance controllable relative to the child in the knowledge expression corresponding to the first electrical appliance. If yes, the voice control instruction is responded. Otherwise, the voice control instruction is not responded.

Optionally, the voice control instruction further includes a target control value corresponding the to-be-controlled attribute. The knowledge expression corresponding to each electrical appliance under children's control further includes an attribute value range of each attribute controllable relative to the child in at least one attribute of the electrical appliance under children's control controllable relative to the child.

When responding to the voice control instruction to control the to-be-controlled attribute of the first electrical appliance, the processing module 703 is specifically configured to determine the attribute value range of the to-be-controlled attribute controllable relative to the child according to the knowledge expression of the first electrical appliance, and determine whether the target control value is within the attribute value range of the to-be-controlled attribute controllable relative to the child. If yes, the attribute value of the to-be-controlled attribute of the first electrical appliance is set as the target control value. Otherwise, the attribute value of the to-be-controlled attribute of the first electrical appliance is set based on the attribute value range of the to-be-controlled attribute controllable relative to the child.

Optionally, the apparatus 700 further includes a knowledge graph construction module 704, configured to:

before the acquisition module 702 obtains the child knowledge graph, extract danger description information of a plurality of electrical appliances from a network resource. The danger description information of each of the plurality of electrical appliances includes danger information of the electrical appliance for the child;

based on the danger description information of the plurality of electrical appliances, divide the plurality of electrical appliances into electrical appliances under children's control and electrical appliances out of children's control;

perform knowledge extraction on the danger description information of at least one electrical appliance under children's control to construct the knowledge expression of at least one electrical appliance under children's control. The child knowledge graph includes the knowledge expression of at least one electrical appliance under children's control. The knowledge expression corresponding to each electrical appliance under children's control in at least one electrical appliance under children's control includes the entity name of the electrical appliance under children's control and at least one attribute of the electrical appliance under children's control controllable relative to the child; and form the child knowledge graph based on the knowledge expression of at least one electrical appliance under children's control.

Optionally, the knowledge expression corresponding to each electrical appliance under children's control further includes the attribute value range of each attribute controllable relative to the child in at least one attribute of the electrical appliance under children's control controllable relative to the child.

When performing knowledge extraction on the danger description information of at least one electrical appliance under children's control to construct the knowledge expression of at least one electrical appliance under children's control, the knowledge graph construction module 704 is specifically configured to determine an attribute value control condition of an adult on each attribute of the electrical appliance under children's control from the danger description information of each electrical appliance under children's control. Based on the attribute value control condition of the adult on each attribute of the electrical appliance under children's control, the attribute value range of each attribute, controllable relative to the child, of the electrical appliance under children's control is determined.

Specific implementations of steps of methods for performing the modules of the apparatus please refer to the specific implementations of the steps of the corresponding methods in the embodiments of the above methods, which will not be described in detail in this embodiment.

Figure 8:
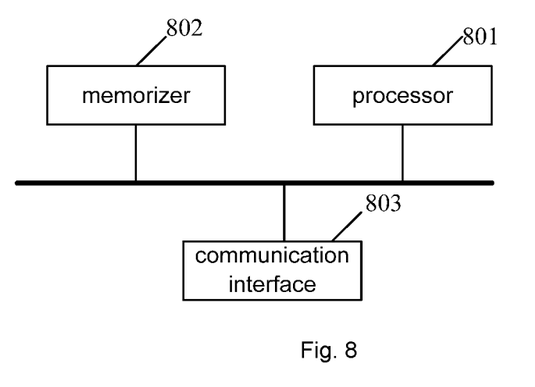
FIG. 8 is a schematic structural diagram of an electronic device according to an embodiment of this application.

Based on the same inventive concept, an embodiment of this application further provides an electronic device 800. Referring to FIG. 8, the electronic device includes at least one processor 801, and a memorizer 802 and a communication interface 803 that are connected to at least one processor 801. The memorizer 802 stores an instruction capable of being performed by the processor 801. The at least one processor 801 performs the instruction stored by the memorizer 802, to cause the electronic device 800 to perform the method for controlling the electrical appliance according to the embodiment of this application when the instruction is performed.

Based on the same inventive concept, embodiments of this application further provide a computer-readable storage medium. The computer-readable storage medium stores a computer instruction. When the computer instruction is run on a computer, the computer may perform the method for controlling the electrical appliance according to the embodiment of this application.

Persons skilled in the art should understand that the embodiments of this application may be provided as a method, a system, or a computer program product. Therefore, this application may adopt forms of complete hardware embodiments, complete software embodiments or embodiments integrating software and hardware. Moreover, this application may adopt the form of a computer program product implemented on one or more computer available storage media (including but being not limited to a disk memory, a Compact Disc Read Only Memory (CD-ROM), an optical memory, etc.) containing computer available program codes.

This application is described with reference to flowcharts and/or block diagrams of the method, the device (system) and the computer program product according to the embodiments of this application. It should be understood that each flow and/or block in the flowchart and/or block diagram, and the combination of the flow and/or block in the flowchart and/or block diagram can be implemented by the computer program instructions. These computer program instructions can be provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in one or more flows of the flowchart and/or one or more blocks of the block diagram.

These computer program instructions may also be stored in the computer-readable memory which can guide the computer or other programmable data processing devices to work in a particular way, so that the instructions stored in the computer-readable memory generate a product including an instruction device. The instruction device implements the specified functions in one or more flows of the flowchart and/or one or more blocks of the block diagram.

These computer program instructions may also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

It is apparent that those skilled in the art can make various modifications and variations to this application without departing from the spirit and scope of this application. Thus, if such modifications and variations of this application fall within the scope of the appended claims and their equivalents, this application is also intended to cover the modifications and variations.

What is claimed is:

1. A method for controlling an electrical appliance, comprising:
   receiving a voice control instruction, the voice control instruction comprising a control object;
   in response to determining that a identity of a user issuing the voice control instruction is a child, acquiring a child knowledge graph, wherein the child knowledge graph comprises a knowledge expression of at least one electrical appliance under children's control, and the knowledge expression corresponding to each electrical appliance under children's control of the at least one electrical appliance under children's control comprises an entity name of the electrical appliance under children's control;
   in response to determining that the control object is a first electrical appliance, determining whether a knowledge expression corresponding to the first electrical appliance exists in the child knowledge graph; and
   when the knowledge expression corresponding to the first electrical appliance doesn't exist in the child knowledge graph, not responding to the voice control instruction;
   otherwise, processing the voice control instruction according to the knowledge expression corresponding to the first electrical appliance in the child knowledge graph;
   wherein the operation before acquiring the child knowledge graph further comprises: extracting danger description information of a plurality of electrical appliances a from a network resource, wherein the danger description information of each of the plurality of electrical appliances comprises danger information of the electrical appliance for the child; according to the danger description information of the plurality of electrical appliances, dividing the plurality of electrical appliances into the electrical appliances under children's control and electrical appliances out of children's control; performing knowledge extraction on the danger description information of at least one electrical appliance under children's control to construct the knowledge expression of at least one electrical appliance under children's control, wherein the child knowledge graph comprises the knowledge expression of at least one electrical appliance under children's control, the knowledge expression corresponding to each electrical appliance under children's control in at least one electrical appliance under children's control comprises the entity name of the electrical appliance under children's control, and at least one attribute of the electrical appliance under children's control controllable relative to the child; and forming the child knowledge graph according to the knowledge expression of at least one electrical appliance under children's control;

wherein the knowledge expression corresponding to each electrical appliance under children's control further comprises the attribute value range of each attribute controllable relative to the child in at least one attribute of the electrical appliance under children's control controllable relative to the child; the operation of performing knowledge extraction on the danger description information of at least one electrical appliance under children's control to construct the knowledge expression of at least one electrical appliance under children's control comprises: determining an attribute value control condition of an adult on each attribute of the electrical appliance under children's control from the danger description information of each electrical appliance under children's control; and according to the tribute value control condition of the adult on each attribute of the electrical appliance under children's control, determining the attribute value range of each attribute, controllable relative to the child, of the electrical appliance under children's control.

2. The method according to claim 1, wherein the voice control instruction further comprises a to-be-controlled attribute corresponding to the control object, and the knowledge expression corresponding to each electrical appliance under children's control further comprises at least one attribute of the electrical appliance under children's control controllable relative to the child; and processing the voice control instruction according to the knowledge expression corresponding to the first electrical appliance in the child knowledge graph comprises:

determining whether the to-be-controlled attribute exists in at least one attribute of the first electrical appliance controllable relative to the child in the knowledge expression corresponding to the first electrical appliance;

when the to-be-controlled attribute exists in at least one attribute of the first electrical appliance controllable relative to the child in the knowledge expression corresponding to the first electrical appliance, responding to the voice control instruction to control the to-be-controlled attribute of the first electrical appliance; and when the to-be-controlled attribute doesn't exist in at least one attribute of the first electrical appliance controllable relative to the child in the knowledge expression corresponding to the first electrical appliance, not responding to the voice control instruction.

3. The method according to claim 2, wherein the voice control instruction further comprises a target control value corresponding the to-be-controlled attribute, and the knowledge expression corresponding to each electrical appliance under children's control further comprises an attribute value range of each attribute controllable relative to the child in at least one attribute of the electrical appliance under children's control controllable relative to the child;

responding to the voice control instruction to control the to-be-controlled attribute of the first electrical appliance comprises:

determining the attribute value range of the to-be-controlled attribute controllable relative to the child according to the knowledge expression of the first electrical appliance; and determining whether the target control value is within the attribute value range of the to-be-controlled attribute controllable relative to the child;

when the target control value is within the attribute value range of the to-be-controlled attribute controllable relative to the child, setting the attribute value of the to-be-controlled attribute of the first electrical appliance as the target control value; otherwise, setting the attribute value of the to-be-controlled attribute of the first electrical appliance based on the attribute value range of the to-be-controlled attribute controllable relative to the child.

4. An electronic device, comprising:

at least one processor, and a computer memory and a communication interface, both connected to the at least one processor, wherein the computer memory stores an instruction capable of being performed by the at least one processor, and the at least one processor is used to perform the instruction in the computer memory, to cause the apparatus to perform the method as claimed in claim 1 when the instruction is performed.

5. A non-transitory computer-readable storage medium, storing a computer program, wherein the computer program comprises a program instruction, and when the program instruction is performed by a computer, the method as claimed in claim 1 is performed by the computer.

* * * * *